(12) United States Patent
Chuang (10) Patent No.: US 9,840,295 B1
(45) Date of Patent: Dec. 12, 2017

(54) BICYCLE BAG

(71) Applicant: Louis Chuang, Taichung (TW)

(72) Inventor: Louis Chuang, Taichung (TW)

( * ) Notice: Subject to any disclaimer, the term of this patent is extended or adjusted under 35 U.S.C. 154(b) by 0 days.

(21) Appl. No.: 15/386,816

(22) Filed: Dec. 21, 2016

(30) Foreign Application Priority Data

Jun. 13, 2016 (TW) .............................. 105208780 U (51) Int. Cl.
*B62J 7/00* (2006.01)
*B62J 11/00* (2006.01)
*B62J 9/00* (2006.01)

(52) U.S. Cl.
CPC ..................... *B62J 9/006* (2013.01)

(58) Field of Classification Search
CPC ......... B62J 7/00; B62J 1/00; B62J 7/02; B62J 9/001; B62J 9/00; B62J 9/005
USPC ........ 224/412, 419, 421, 425, 427, 430, 431
See application file for complete search history.

(56) References Cited

U.S. PATENT DOCUMENTS

| | | | | |
|---|---|---|---|---|
| 4,442,960 A * | 4/1984 | Vetter | ........................ | B62J 9/00 190/108 |
| 5,031,807 A * | 7/1991 | Tiffany | ................... | B62J 9/005 150/108 |
| 5,071,046 A * | 12/1991 | Miller | ..................... | B62J 9/005 224/585 |
| 5,190,345 A * | 3/1993 | Lin | ........................ | B62J 9/006 224/427 |
| 5,358,142 A * | 10/1994 | Holmes | ..................... | B62J 99/00 222/1 |
| 5,862,965 A * | 1/1999 | Nakahara | ................. | B62J 11/00 224/419 |
| 6,029,875 A * | 2/2000 | Johnston | ................ | A45C 13/36 224/153 |
| 6,123,239 A * | 9/2000 | Lovitt | ........................ | B62J 9/00 190/103 |
| 8,225,973 B1 * | 7/2012 | Bellinson | ................... | A45F 3/02 224/257 |
| 2004/0238549 A1 * | 12/2004 | Murray | ..................... | B62J 9/005 220/705 |
| 2008/0178642 A1 * | 7/2008 | Sanders | ..................... | B62J 9/00 70/64 |
| 2010/0012696 A1 * | 1/2010 | Prager | ..................... | B62J 9/005 224/417 |
| 2012/0187170 A1 * | 7/2012 | Ho | ............................. | B62J 9/02 224/441 |
| 2015/0344089 A1 * | 12/2015 | Bopanna | ..................... | B62J 9/00 224/430 |
| 2016/0096573 A1 * | 4/2016 | Pusateri | .................. | B62J 9/005 224/425 |

FOREIGN PATENT DOCUMENTS

TW      M466850 U      12/2013

* cited by examiner

*Primary Examiner* — Brian D Nash
(74) *Attorney, Agent, or Firm* — Alan D. Kamrath; Kamrath IP Lawfirm, P.A.

(57) ABSTRACT

A bicycle bag includes a bag body and at least one adjusting belt assembly. The bag body is adapted to store bicycle accessories and includes a first penetration portion and a second penetration portion. The at least one adjusting belt assembly is selectively inserted through one of the first and second penetration portions to form a suspending portion attachable to a bicycle. Thus, the bicycle bag can be attached to an up tube or a seat post of a bicycle, or attached between the saddle and the seat post of a bicycle to meet user needs.

8 Claims, 9 Drawing Sheets

BICYCLE BAG

BACKGROUND OF THE INVENTION

The present invention relates to a bicycle bag and, more particularly, to a bicycle bag or an accessory container, constructed to be suspended from beneath a portion of a bicycle.

Taiwan Utility Model Patent No. M466850 discloses a bicycle bag, which includes a bag body provided with a space having an opening. The bag body includes a first cover plate and a second cover plate respectively disposed at two sides of the opening, and two folding portions respectively disposed at the other two sides of the opening. Each folding portion includes a first folding plate and a second folding plate foldable relative to each other. Each first folding plate is connected to the first cover plate. Each second folding plate is connected to the second cover plate. The bag body further includes a first connecting portion disposed adjacent to the first cover plate. The second cover plate includes a second connecting portion. The first folding plate can be foldable inwards relative to the second folding plate to cause the first cover plate to cover the opening, and, then, the first and second folding plates can be folded again to cause the second cover plate folded towards the opening to cover outside the first cover plate. The second connecting portion can be connected with the first connecting portion. Thus, the opening of the bag body can be perfectly covered to avoid water to percolate into the bag body.

However, the above-mentioned bicycle bag only can be attached between the bicycle saddle and the seat post. It cannot be selectively attached to other portions of the bicycle according to user needs.

The present invention is, therefore, intended to obviate or at least alleviate the problems encountered in the prior art.

BRIEF SUMMARY OF THE INVENTION

The present invention solves this need and other problems in the field of bicycle bags by providing a bicycle bag including a bag body and at least one adjusting belt assembly. The bag body is adapted to store bicycle accessories and includes a first penetration portion and a second penetration portion. The at least one adjusting belt assembly is selectively inserted through one of the first and second penetration portions to form a suspending portion attachable to a bicycle. Thus, the bicycle bag can be attached to the up tube or the seat post of a bicycle, or attached between the saddle and the seat post of a bicycle to meet user needs.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

All figures are drawn for ease of explanation of the basic teachings only; the extensions of the figures with respect to number, position, relationship, and dimensions of the parts to form the illustrative embodiments will be explained or will be within the skill of the art after the following teachings have been read and understood. Further, the exact dimensions and dimensional proportions to conform to specific force, weight, strength, and similar requirements will likewise be within the skill of the art after the following teachings have been read and understood.

Where used in the various figures of the drawings, the same numerals designate the same or similar parts. Furthermore, when the terms "first", "second", "third", "fourth", "end", "portion", "longitudinal", "radial", "diameter", "width", "thickness", and similar terms are used herein, it should be understood that these terms have reference only to the structure shown in the drawings as it would appear to a person viewing the drawings and are utilized only to facilitate describing the illustrative embodiments.

DETAILED DESCRIPTION OF THE INVENTION

FIGS. 1-9 show a bicycle bag according to the present invention. The bicycle bag includes a bag body 10 adapted to store bicycle accessories, and at least one adjusting belt assembly 20 adapted to be attached to a portion of a bicycle B. In the embodiment, the bicycle bag includes two adjusting belt assemblies 20.

Figure 1:
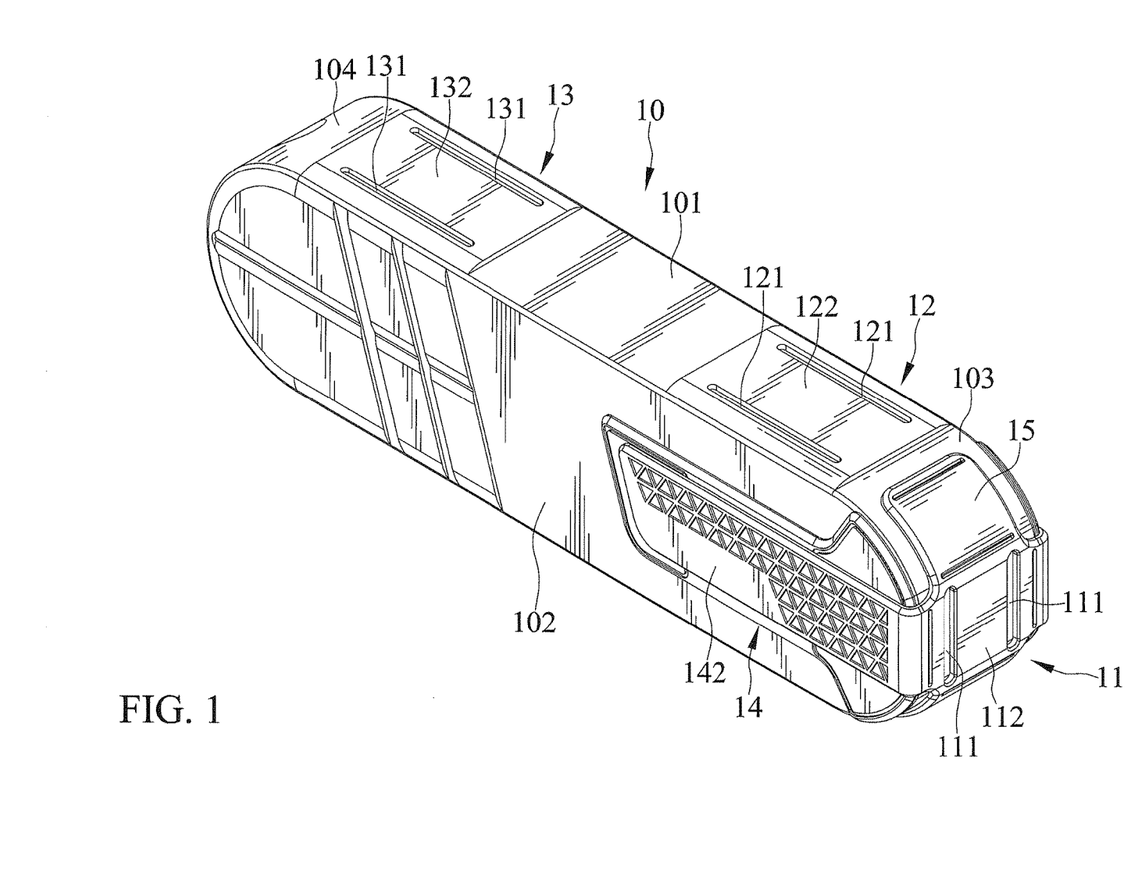
FIG. 1 shows a perspective view of a bicycle bag according to the present invention, and illustrates the bicycle bag having a bag body.

Bag body 10 includes a top face 101, two side faces 102, a first end face 103, a second end face 104, and a bottom face 105. Two side faces 102 are respectively connected to two opposite sides of top face 101 and extend away from top face 101. First end face 103 is connected to one end of top face 101 and two side faces 102. Second end face 104 is connected to the other end of top face 101 opposite to first end face 103, and two side faces 102. Two opposite sides of bottom face 105 are respectively connected to two sides of two side faces 102 opposite to top face 101, and first and second end faces 103 and 104. A zip fastener A is disposed on second end face 104 and bottom face 105. Thus, a user can operate zip fastener A to put bicycle accessories in bag body 10, or take bicycle accessories from bag body 10.

Bag body 10 further includes a first penetration portion 11, a second penetration portion 12, a third penetration portion 13, a fourth penetration portion 14, a first extending portion 15, and a second extending portion 16. First penetration portion 11 is disposed at first end face 103. Second penetration portion 12 is disposed at one end of top face 101 adjacent to first end face 103. Third penetration portion 13 is disposed at the other end of top face 101 adjacent to second end face 104. Fourth penetration portion 14 is disposed at two side faces 102. First and second extending portions 15 and 16 are respectively disposed at two opposite sides of first penetration portion 11. First extending portion 15 is disposed at a side of first end face 103 adjacent to top face 101. Second extending portion 16 is disposed at the other side of first end face 103 adjacent to bottom face 105. A first passage is formed between first extending portion 15 and first end face 103. Two opposite sides of the first passage respectively extend towards two side faces 102. A second passage is formed between second extending portion 16 and first end face 103. Two opposite sides of the second passage respectively extend towards two side faces 102. In the embodiment, first end face 103 is substantially a curved surface. First penetration portion 11, and first and second extending portions 15 and 16 are integrally formed with each other and are abutted against first end face 103 to form a substantial curved surface.

First penetration portion 11 includes two first through holes 111 and a first abutting face 112 located between two first through holes 111. A first space is formed between first abutting face 112 and first end face 103. The first space is interconnected with two first through holes 111 to cause two first through holes 111 to be connected to each other.

Second penetration portion 12 includes two second through holes 121 and a second abutting face 122 located between two second through holes 121. A second space is formed between second abutting face 122 and top face 101. The second space is interconnected with two second through holes 121 to cause two second through holes 121 to be connected to each other.

Third penetration portion 13 includes two third through holes 131 and a third abutting face 132 located between the two third through holes 131. A third space is formed between third abutting face 132 and top face 101. The third space is interconnected with two third through holes 131 to cause two third through holes 131 to be connected to each other.

Fourth penetration portion 14 includes two penetration passages 141 and two fourth abutting faces 142 respectively located at the two side faces 102 to form the two penetration passages 141. Two opposite sides of two penetration passages 141 respectively extend towards top face 101 and bottom face 105.

Adjusting belt assembly 20 is selectively inserted through one of the first, second, third and fourth penetration portions 11, 12, 13 and 14 to form a suspending portion 201 attachable to the bicycle B. In the embodiment, one of adjusting belt assemblies 20 is inserted through one of the first, second, third and fourth penetration portions 11, 12, 13 and 14. The other one of adjusting belt assemblies 20 is inserted through one of the remaining penetration portions.

Adjusting belt assembly 20 includes a belt member 21 and a buckle member 22. Belt member 21 is selectively inserted through one of the first, second, third and fourth penetration portions 11, 12, 13 and 14. Two opposite ends of belt member 21 is adapted to connect to two opposite ends of buckle member 22 to form suspending portion 201.

Belt member 21 includes a connecting section 211 disposed opposite to buckle member 22. Buckle member 22 includes a penetrating hole 221 penetrating therethrough. Connecting section 211 is able to be slideably inserted through penetrating hole 221 and selectively to attach on any portion of belt member 21 to adjust a size of suspending portion 201. In the embodiment, connecting section 211 is made of VELCRO® fasteners.

Figure 2:
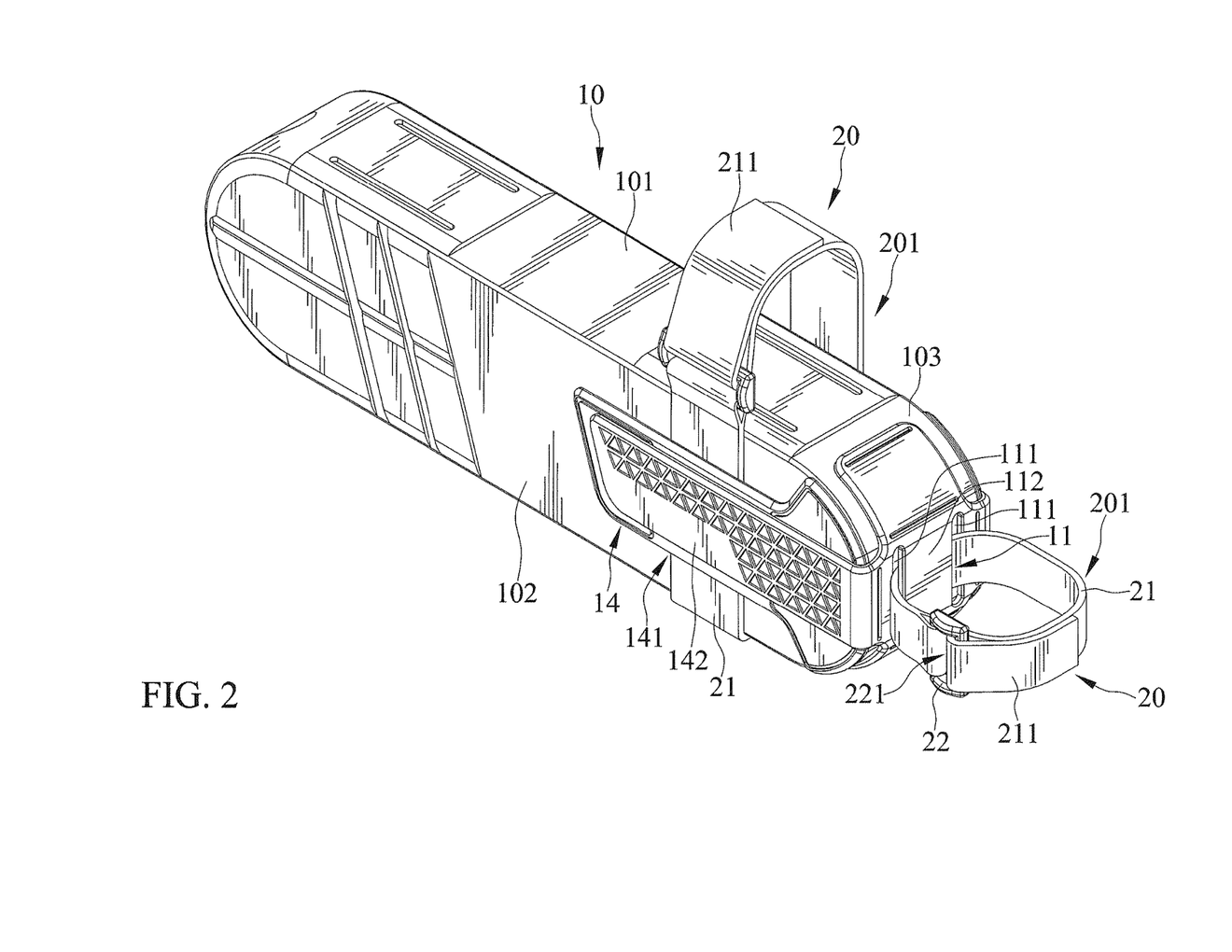
FIG. 2 shows a perspective view of the bicycle bag of FIG. 1, and illustrates two adjusting belt assemblies inserted through the bag body to form two suspending portions.
Figure 3:
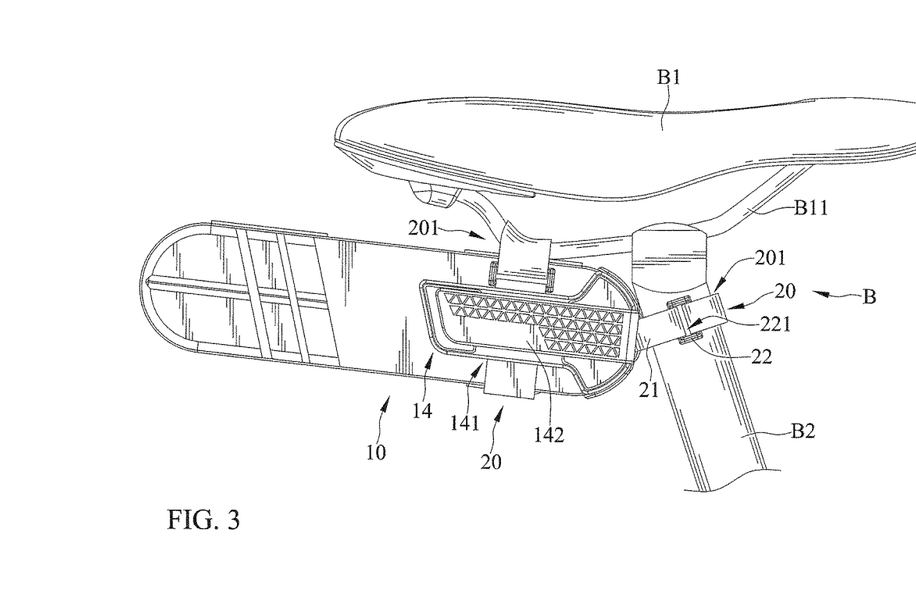
FIG. 3 shows a continued view of the bicycle bag of FIG. 2, and illustrates the two suspending portions respectively attached to saddle rails of a saddle and a seat post of a bicycle.

FIGS. 2 and 3 show belt member 21 of one of two adjusting belt assemblies 20 is inserted through one of two first through holes 111, the first space, and the other one of two first through holes 111. Then, belt member 21 wraps around a seat post B2 of bicycle B and finally is inserted through penetrating hole 221 to form suspending portion 201. Belt member 21 of the other one of two adjusting belt assemblies 20 is inserted through one of two penetration passages 141, and then abuts against bottom face 105 to insert through the other one of two penetration passages 141. Then, belt member 21 wraps around saddle rails B11 of bicycle B and finally is inserted through penetrating hole 221 to form suspending portion 201. Thus, the bicycle bag can be attached between seat post B2 and saddle rails B11 of bicycle B.

Figure 4:
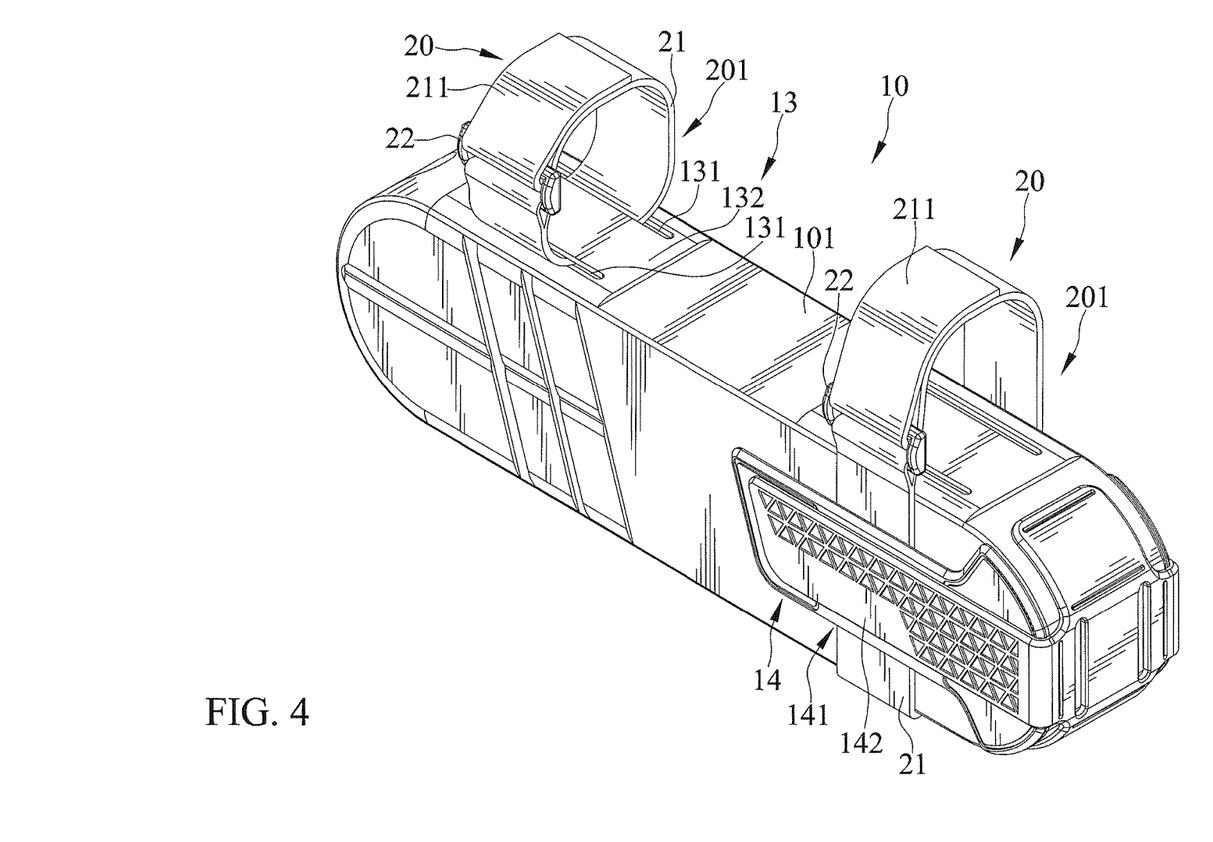
FIG. 4 shows another perspective view of the bicycle bag of FIG. 1, and illustrates the two adjusting belt assemblies inserted through other portions of the bag body to form the two suspending portions.
Figure 5:
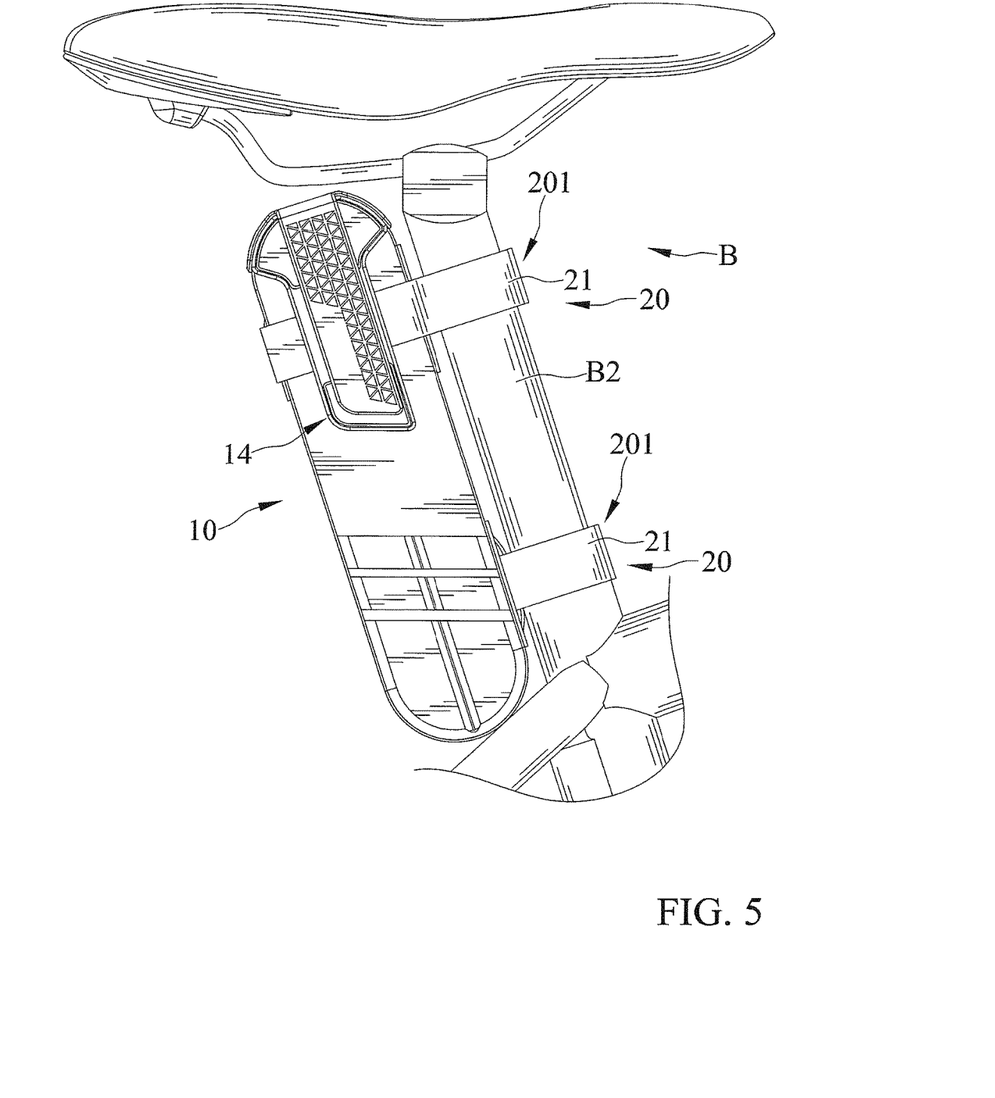
FIG. 5 shows a continued view of the bicycle bag of FIG. 4, and illustrates the two suspending portions both attached to the seat post of the bicycle.

FIGS. 4 and 5 show belt member 21 of one of two adjusting belt assemblies 20 is inserted through one of two third through holes 131, the third space, and the other one of two third through holes 131. Then, belt member 21 wraps around seat post B2 of bicycle B and finally is inserted through penetrating hole 221 to form suspending portion 201. Belt member 21 of the other one of two adjusting belt assemblies 20 is inserted through one of two penetration passages 141, and then abuts against bottom face 105 to insert through the other one of two penetration passages 141. Then, belt member 21 wraps around seat post B2 and finally is inserted through penetrating hole 221 to form suspending portion 201. Thus, the bicycle bag can be attached to seat post B2 of bicycle B.

Figure 6:
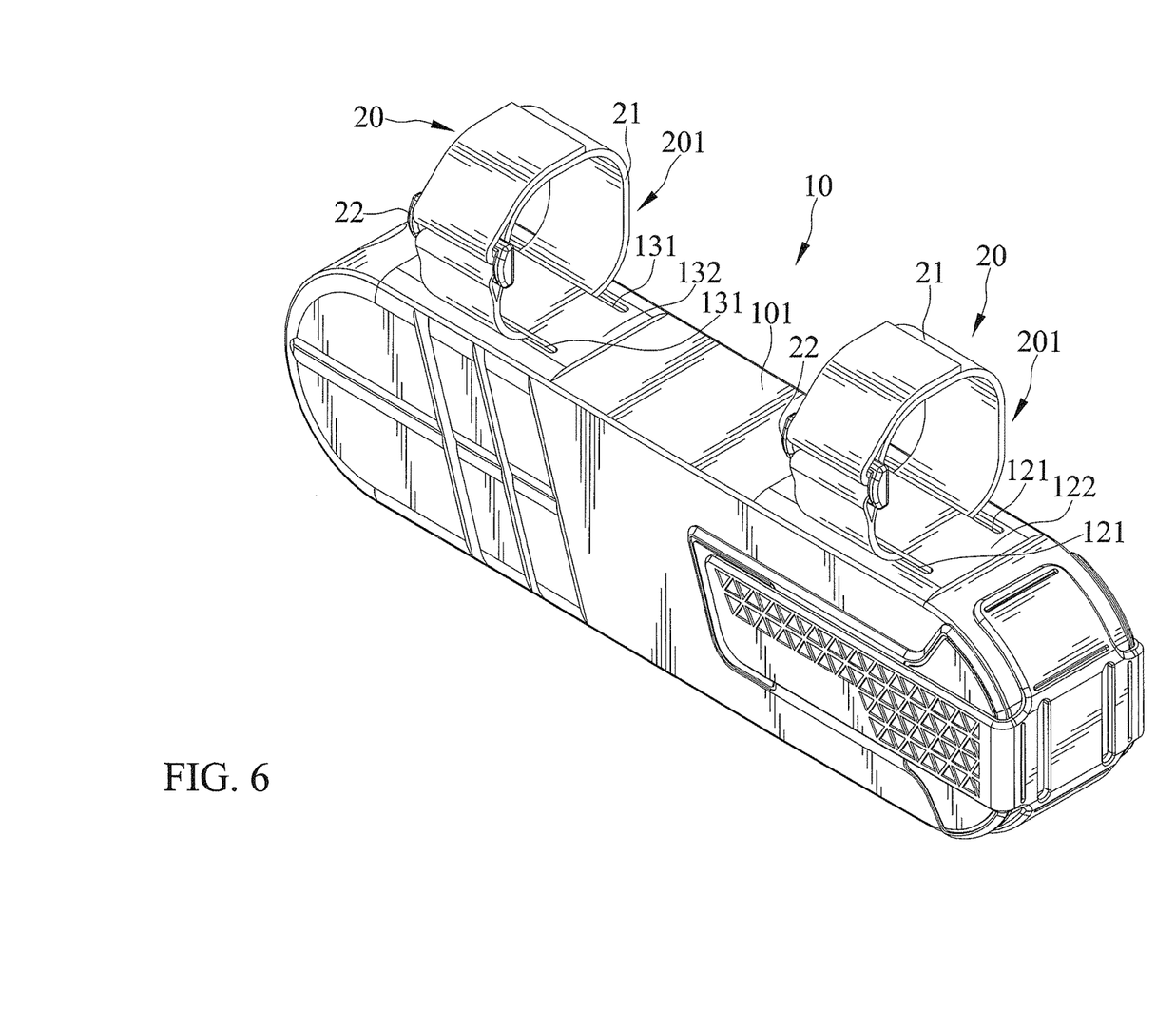
FIG. 6 shows another perspective view of the bicycle bag of FIG. 1, and illustrates the two adjusting belt assemblies inserted through other portions of the bag body to form the two suspending portions.
Figure 7:
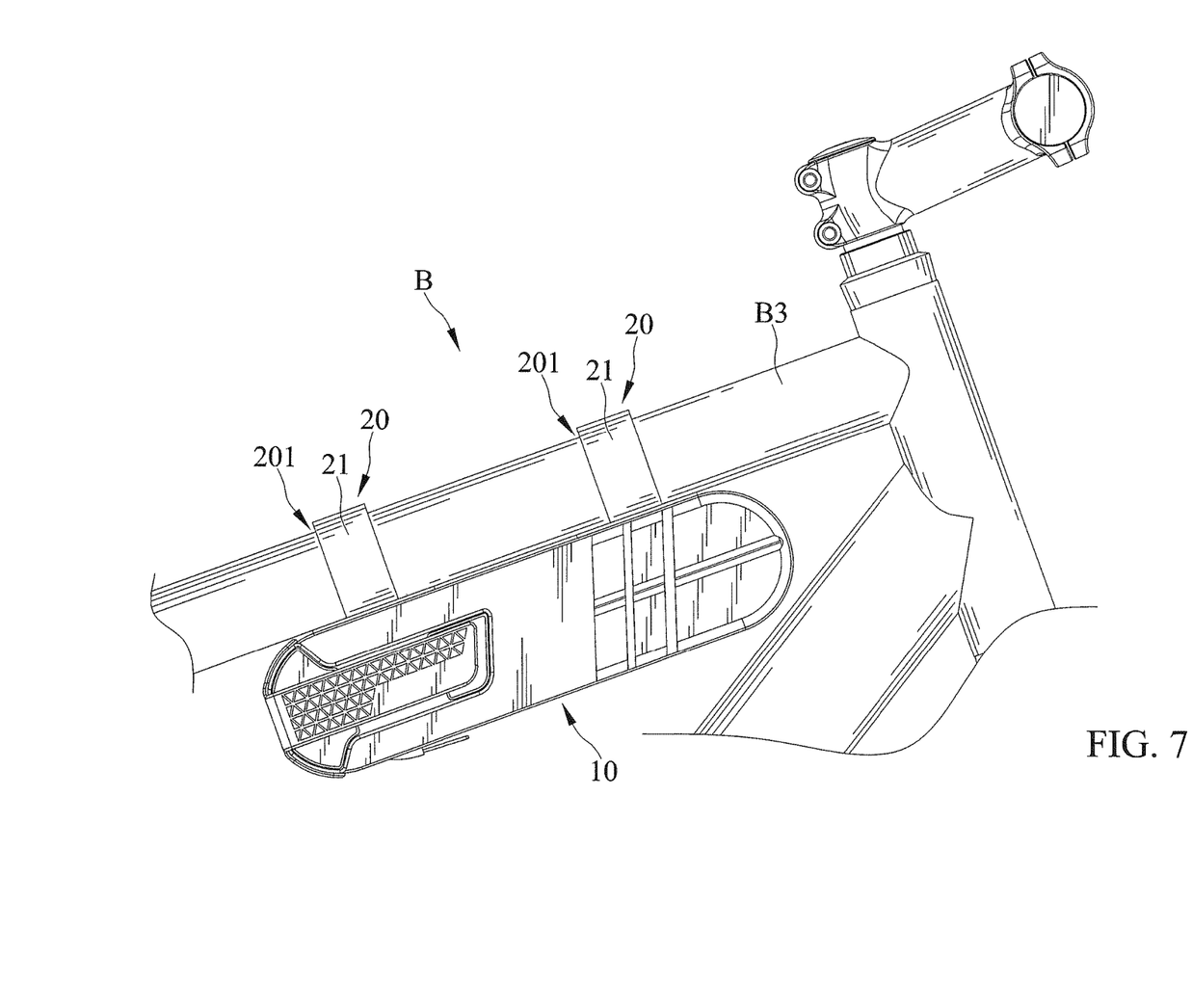
FIG. 7 shows a continued view of the bicycle bag of FIG. 6, and illustrates the two suspending portions both attached to an up tube of the bicycle.

FIGS. 6 and 7 show belt member 21 of one of two adjusting belt assemblies 20 is inserted through one of two second through holes 121, the second space, and the other one of two second through holes 121. Then, belt member 21 wraps around an up tube B3 of bicycle B and finally is inserted through penetrating hole 221 to form suspending portion 201. Belt member 21 of the other one of two adjusting belt assemblies 20 is inserted through one of two third through holes 131, the third space, and the other one of two third through holes 131. Then, belt member 21 wraps around up tube B3 and finally is inserted through penetrating hole 221 to form suspending portion 201. Thus, the bicycle bag can be attached to up tube B3 of bicycle B.

Figure 8:
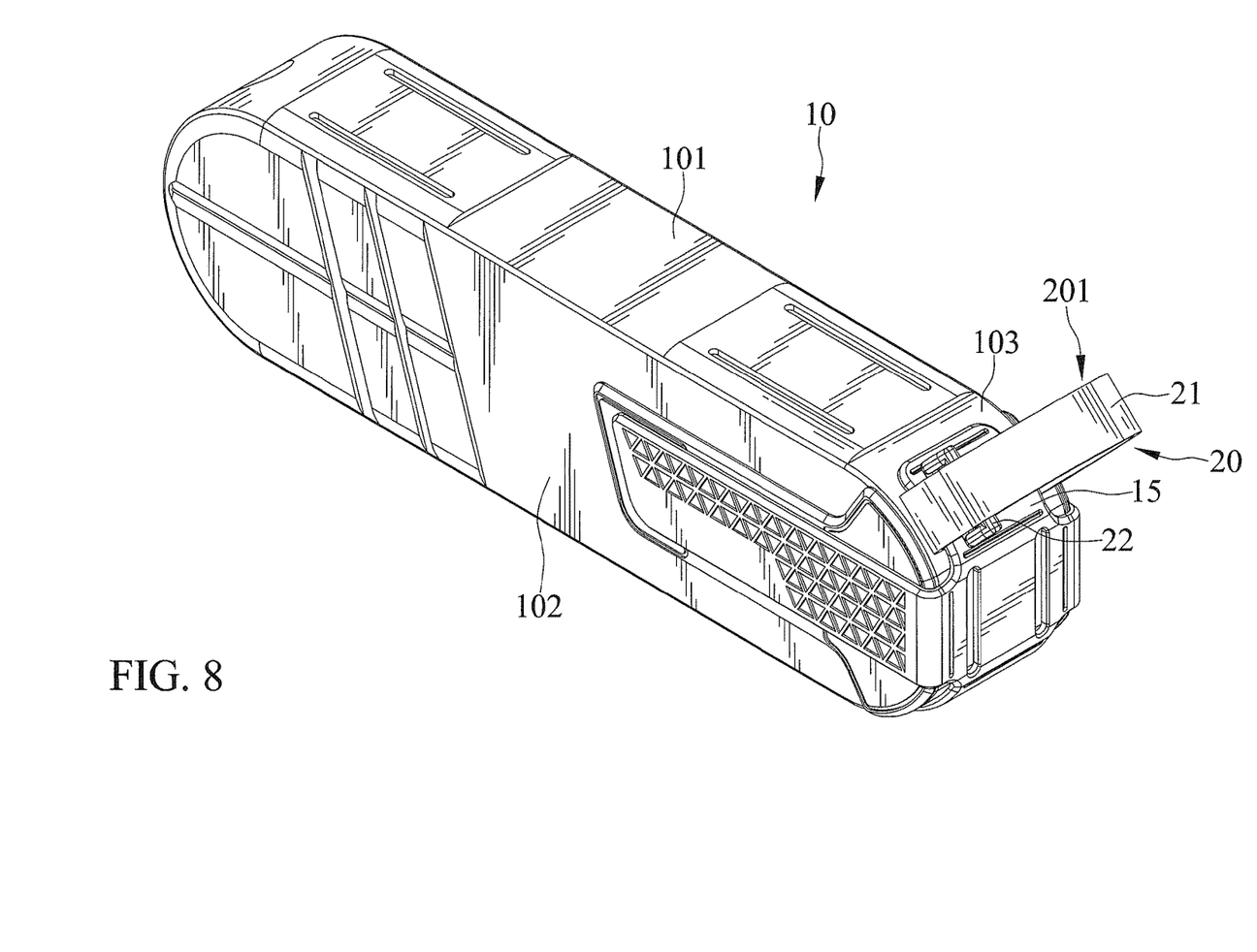
FIG. 8 shows another perspective view of the bicycle bag of FIG. 1, and illustrates one adjusting belt assembly inserted through one portion of the bag body to form a suspending portion.

FIG. 8 shows belt member 21 is inserted through the first passage disposed between first extending portion 15 and first end face 103, and, then, belt member 21 is inserted through penetrating hole 221 to form suspending portion 201.

Figure 9:
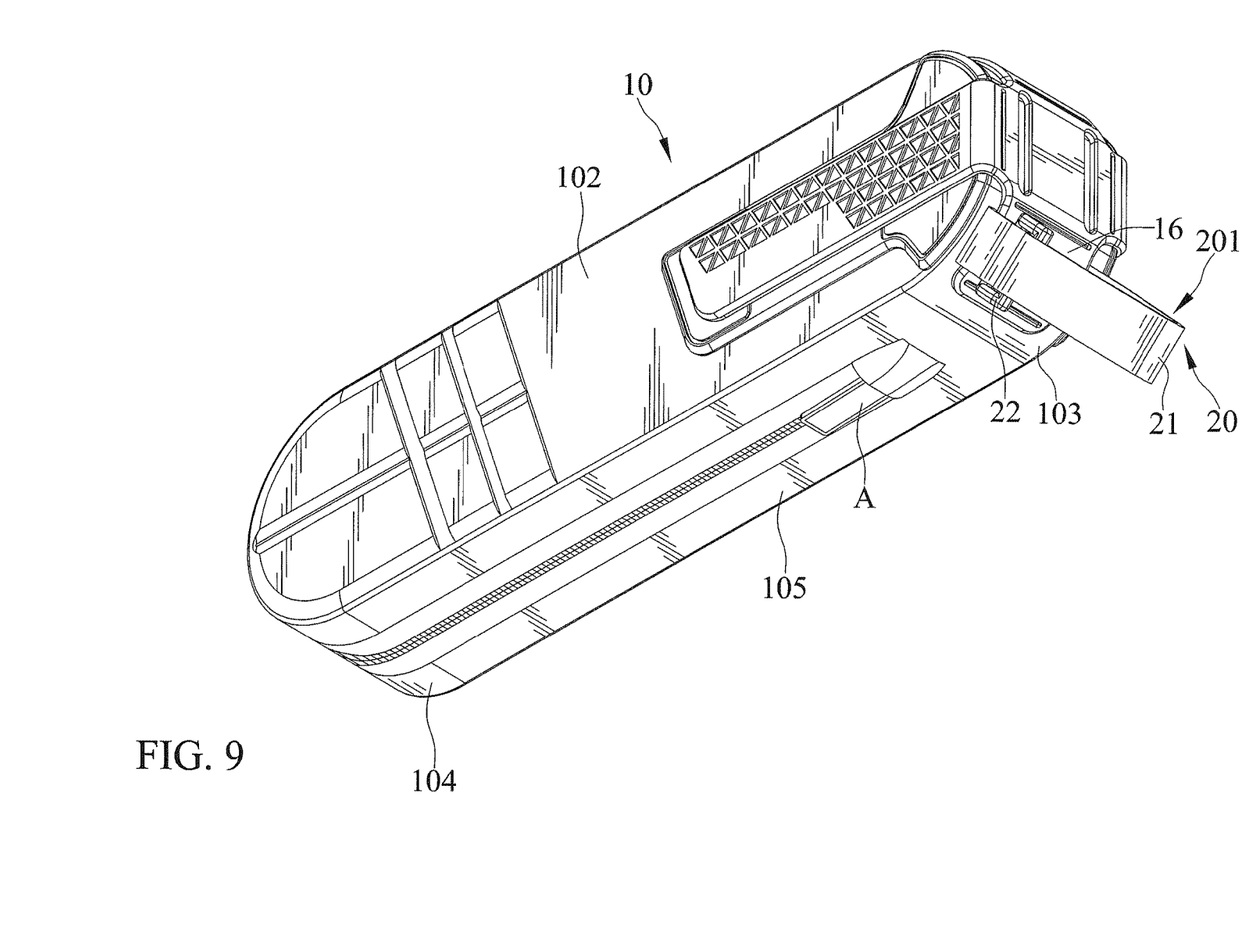
FIG. 9 shows another perspective view of the bicycle bag of FIG. 1, and illustrates one adjusting belt assembly inserted through another portion of the bag body to form a suspending portion.

FIG. 9 shows belt member 21 is inserted through the second passage disposed between second extending portion 16 and first end face 103, and, then, belt member 21 is inserted through penetrating hole 221 to form suspending portion 201.

Thus, the bicycle bag can be attached to up tube B3 or seat post B2 of bicycle B, or attached between saddle B1 and seat post B2 of bicycle B to meet user needs.

Thus since the illustrative embodiments disclosed herein may be embodied in other specific forms without departing from the spirit or general characteristics thereof, some of which forms have been indicated, the embodiments described herein are to be considered in all respects illustrative and not restrictive. The scope is to be indicated by the appended claims, rather than by the foregoing description, and all changes which come within the meaning and range of equivalency of the claims are intended to be embraced therein.

The invention claimed is:

1. A bicycle bag comprising: a bag body adapted to store bicycle accessories and including a first penetration portion, a second penetration portion, a third penetration portion and a fourth penetration portion; and at least one adjusting belt assembly selectively inserted through one of the first, second, third and fourth penetration portions to form a suspending portion attachable to a bicycle, with the first penetration portion including two first through holes connected to each other, with the second penetration portion including two second through holes, with the third penetration portion including two third through holes connected to each other, with the fourth penetration portion including two penetration passages respectively disposed at two opposite sides of the bag body, and with the at least one adjusting belt assembly selectively inserted through one of the two first through holes, the two second through holes, the two third through holes, and the two penetration passages.

2. The bicycle bag as claimed in claim 1, with the bag body including a top face, two side faces respectively connected to two opposite sides of the top face, and a first end face connected to one end of the top face, with the two side faces extending away from the top face, with the first end face connected to the two side faces, with the first penetration portion disposed at the first end face, with the second penetration portion and the third penetration portion respectively disposed at the two opposite sides of the top face, and with the two penetration passages respectively disposed at the two side faces and located adjacent to the first end face.

3. The bicycle bag as claimed in claim 2, with the first penetration portion including a first abutting face located between the two first through holes, and with the at least one adjusting belt assembly able to be inserted through the two first through holes to located between the first end face and the first abutting face.

4. The bicycle bag as claimed in claim 2, with the second penetration portion including a second abutting face located between the two second through holes, and with the at least one adjusting belt assembly able to be inserted through the two second through holes to located between the top face and the second abutting face.

5. The bicycle bag as claimed in claim 2, with the third penetration portion including a third abutting face located between the two third through holes, and with the at least one adjusting belt assembly able to be inserted through the two third through holes to located between the top face and the third abutting face.

6. The bicycle bag as claimed in claim 2, with the fourth penetration portion including two fourth abutting faces respectively located at the two side faces to form the two penetration passages, and with the at least one adjusting belt assembly able to be inserted through the two penetration passages to located between one of the two side faces and one of the two fourth abutting faces, and between another one of the two side faces and another one of the two fourth abutting faces.

7. The bicycle bag as claimed in claim 1, with the at least one adjusting belt assembly including a belt member and a buckle member, with the belt member selectively inserted through one of the first, second, third and fourth penetration portions, and with two opposite ends of the belt member adapted to connect to two opposite ends of the buckle member to form the suspending portion.

8. The bicycle bag as claimed in claim 7, with the belt member including a connecting section disposed opposite to the buckle member, with the buckle member including a penetrating hole penetrating therethrough, and with the connecting section able to be inserted through the penetrating hole and selectively to attach on one portion of the belt member to adjust a size of the suspending portion.

* * * * *